United States Patent
Roberson et al.

(10) Patent No.: US 7,441,106 B2
(45) Date of Patent: Oct. 21, 2008

(54) DISTRIBUTED PROCESSING IN A MULTIPLE PROCESSING UNIT ENVIRONMENT

(75) Inventors: Randy L. Roberson, New Port Richey, FL (US); Tarun Thakur, Fremont, CA (US); Justus Joseph Pendleton, Colorado Springs, CO (US)

(73) Assignee: Seagate Technology LLC, Scotts Valley, CA (US)

(*) Notice: Subject to any disclaimer, the term of this patent is extended or adjusted under 35 U.S.C. 154(b) by 567 days.

(21) Appl. No.: 10/884,602

(22) Filed: Jul. 2, 2004

(65) Prior Publication Data

US 2006/0004990 A1  Jan. 5, 2006

(51) Int. Cl.
*G06F 9/302* (2006.01)

(52) U.S. Cl. .......................... 712/221; 712/28
(58) Field of Classification Search .............. 712/28, 712/31, 32, 34, 221; 718/105; 717/159
See application file for complete search history.

(56) References Cited

U.S. PATENT DOCUMENTS

| | | | |
|---|---|---|---|
| 3,943,494 A | | 3/1976 | Holmes, Jr. et al. |
| 4,201,889 A | | 5/1980 | Lawrence et al. |
| 4,270,167 A | | 5/1981 | Koehler et al. |
| 4,310,879 A | | 1/1982 | Pandeya |
| 4,819,152 A | | 4/1989 | Deerfield et al. |
| 4,947,364 A | * | 8/1990 | Mahon et al. ............... 708/625 |
| 5,134,578 A | | 7/1992 | Garverick et al. |
| 5,203,002 A | | 4/1993 | Wetzel |
| 5,226,170 A | | 7/1993 | Rubinfeld |
| 5,276,819 A | | 1/1994 | Rau et al. |
| 5,442,581 A | | 8/1995 | Poland |
| 5,467,131 A | * | 11/1995 | Bhaskaran et al. ..... 375/240.25 |
| 5,504,912 A | | 4/1996 | Morinaga et al. |
| 5,808,926 A | | 9/1998 | Gorshtein et al. |

(Continued)

FOREIGN PATENT DOCUMENTS

JP   03262076 A   11/1991

(Continued)

OTHER PUBLICATIONS

Ma, Gin-Kou and Taylor, Fred J. "Multiplier Policies For Digital Signal Processing". IEEE Assp Magazine. Jan. 1990. pp. 6-20.*

(Continued)

*Primary Examiner*—Aimee J Li
(74) *Attorney, Agent, or Firm*—Fellers, Snider, et al.

(57) ABSTRACT

Method and apparatus for performing distributed processing in a multi-processing unit environment. A first processing unit modifies a complex operation to provide an operational request packet comprising a corresponding simplex operation and remainder. The packet is communicated to a second processing unit which processes the packet to arrive at a result for the complex operation, preferably by arriving at a result for the simplex operation and combining this result with the remainder. In this way, inter-processor operations can be efficiently encoded and distributed to meet the requirements of a given architecture. Preferably, the first processing unit determines the remainder by separately arriving at the result for the complex operation. The complex operation is preferably characterized as a mathematical operation on a non-power of two operand (e.g., 30), and the simplex operation is characterized as a mathematical operation on a power of two operand (e.g., 32).

20 Claims, 2 Drawing Sheets

U.S. PATENT DOCUMENTS

| | | |
|---|---|---|
| 5,909,565 A | 6/1999 | Morikawa et al. |
| 5,963,461 A | 10/1999 | Gorshtein et al. |
| 6,198,751 B1 | 3/2001 | Dorsey et al. |
| 6,223,240 B1 | 4/2001 | Odenwald et al. |
| 6,256,696 B1 | 7/2001 | Carbillet |
| 6,327,647 B1 | 12/2001 | Moyer et al. |
| 6,401,185 B1 | 6/2002 | Sexton et al. |
| 6,434,689 B2 | 8/2002 | Fleck et al. |
| 6,473,086 B1 | 10/2002 | Morein et al. |
| 6,505,290 B1 | 1/2003 | Moyer et al. |
| 6,594,753 B2 | 7/2003 | Choquette et al. |
| 2004/0246955 A1* | 12/2004 | Georgescu et al. .......... 370/389 |

FOREIGN PATENT DOCUMENTS

JP 06175583 A 6/1994

OTHER PUBLICATIONS

Comer, Douglas E. Internetworking with TCP/IP Principles, Protocols, and Architectures. Fourth Edition. Upper Saddle River, NJ: Prentice-Hall, Inc., © 2000. pp. 102-106; 113; 607; and 688.*

* cited by examiner

DISTRIBUTED PROCESSING IN A MULTIPLE PROCESSING UNIT ENVIRONMENT

FIELD OF THE INVENTION

The claimed invention relates generally to the field of data processing systems and more particularly, but not by way of limitation, to an apparatus and method for performing distributed processing in a multiple processing unit environment.

BACKGROUND

Data processing systems can utilize one or more processing units, such as hardware-based or programmable processors, to carry out various operations. When multiple processing units are employed, an appropriately selected processing hierarchy enables the units to communicate with one another and share operational loading, thereby enhancing processing efficiency.

Multiple processing units can be arranged as peers, or the processing units can be arranged such that one unit serves as a main unit to provide top level operational control, and the remaining units serve as peripheral processors which support the main processor.

It can be desirable to have a second processor perform an operation (e.g., a mathematical operation such as division) using operands passed from a first processor. While operable, a limitation associated with this approach arises if the second processor does not have a native ability to perform the requested operation. Customized hardware or software (code) can be provided in order to assist the second processor to complete the operation, but such modifications can be difficult and expensive to implement, and can have adverse effects on array efficiency.

Accordingly, there is a continual need for improvements in the configuration and operation of multiple processor environments.

SUMMARY OF THE INVENTION

Preferred embodiments of the present invention are generally directed to a method and an apparatus for performing distributed processing in a multi-processing unit environment.

In accordance with some preferred embodiments, the method preferably comprises employing a first processing unit to modify a complex operation to provide an operational request packet comprising a corresponding simplex operation and remainder.

The method further preferably comprises using a second processing unit to process said packet to arrive at a result for the complex operation. Preferably, the second processing unit obtains a result for the simplex operation and then combines this result with the remainder to arrive at the result for the complex operation.

The first processing unit preferably determines the remainder during the employing step by separately arriving at said result for the complex operation. Moreover, the first processing unit further preferably determines the result for the simplex operation and determines the remainder in relation to the respective results for the simplex operation and the complex operation.

Preferably, the initial complex operation is characterized as a mathematical operation on a first operand and the simplex operation is characterized as a mathematical operation on a second operand, wherein the first operand is not a power of two and the second operand is a power of two.

In accordance with further preferred embodiments, an apparatus comprises a first processing unit and a second processing unit. The first processing unit is adapted to modify an initial complex operation to provide an operational request packet comprising a simplex operation and a remainder. The second processing unit is adapted to process said packet to arrive at a result for the complex operation. At least a selected one of the first and second processing units is preferably characterized as a general purpose programmable computer.

As before, the first processing unit is preferably adapted to determine the remainder by separately arriving at said result for the complex operation, and to determine the remainder by arriving at a result for the simplex operation and combining such with the result for the complex operation.

Also, as before the complex operation is preferably characterized as a mathematical operation on a first operand and the simplex operation is preferably characterized as a mathematical operation on a second operand, wherein the first operand is not a power of two and the second operand is a power of two.

In this way, inter-processor operations can be efficiently encoded and distributed to meet the requirements of a given architecture.

These and various other features and advantages which characterize the claimed invention will become apparent upon reading the following detailed description and upon reviewing the associated drawings.

DETAILED DESCRIPTION

Figure 1:
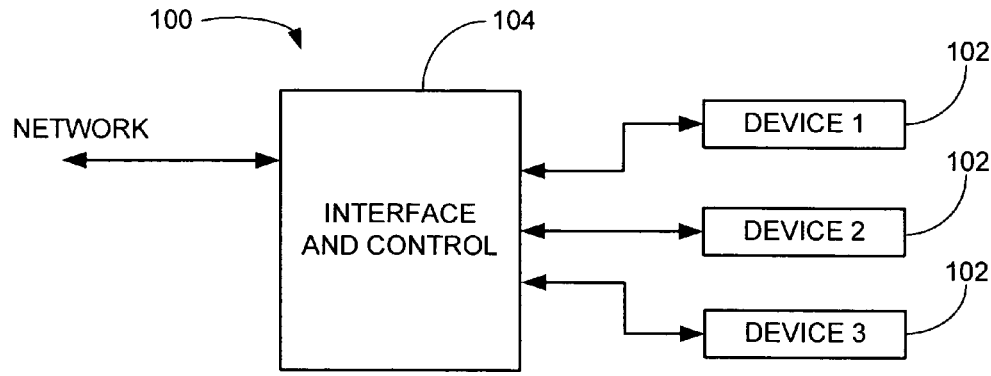
FIG. 1 is a top level functional block depiction of a data storage array constructed and operated in accordance with preferred embodiments of the present invention.

To illustrate an exemplary environment in which presently preferred embodiments of the present invention can be advantageously practiced, FIG. 1 shows a data storage array 100 of the type configured to store and retrieve digital data for a computer network (not shown).

The array 100 is preferably characterized as a RAID (Redundant Array of Inexpensive Discs) and comprises a number of individual data storage devices 102. The devices 102 are concurrently operated by an interface and control circuit 104 so as to present an overall data storage array for use by the network. Data are stored across the various devices 102 using appropriate RAID protocols.

Figure 2:
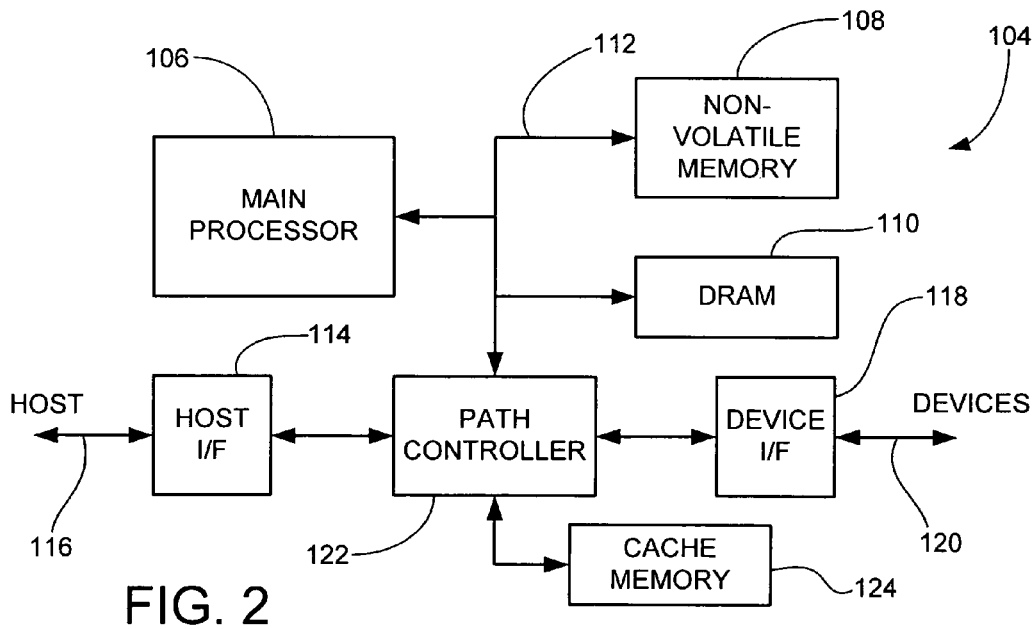
FIG. 2 illustrates an interface and control circuit of the array of FIG. 1.

FIG. 2 illustrates the interface and control circuit 104 in greater detail. The circuit 104 can be embodied in a single integrated circuit, or distributed among a number of discrete circuits as desired.

A main processor 106, preferably characterized as a programmable, general purpose computer processor, provides top level control in accordance with programming steps and processing data stored in non-volatile memory 108 (such as flash memory or similar) and in dynamic random access memory (DRAM) 110. The memory devices 108, 110 communicate with the main processor 106 via bus 112.

A host interface (I/F) circuit 114 communicates with a host (not shown) from the network via bus 116, and a device I/F circuit 118 communicates with the storage array (devices 102, FIG. 1) via bus 120. These circuits 114, 118, along with a path controller 122, form a communication path to pass commands and data between the storage array and the host.

The path controller 122 is preferably characterized as a programmable, specially configured processor. The controller 122 operates in conjunction with programming steps and commands from cache memory 124 as well as from inputs from the main processor 106 to control the flow of data to and from the devices 102. For purposes herein, the main processor 106 and the path controller 122 will also be referred to herein respectively as "first" and "second" processors/processing units.

In accordance with preferred embodiments, the main processor 106 is adapted to make operational requests to the path controller 122. Such requests can be mission specific, such as a request to place particular data in a certain memory location accessible by the controller 122 in order to facilitate normal operation of the array 100. Such requests can also be made in order to offload certain operations from the main processor 106 and onto the controller 122 during a high utilization period.

Figure 3:
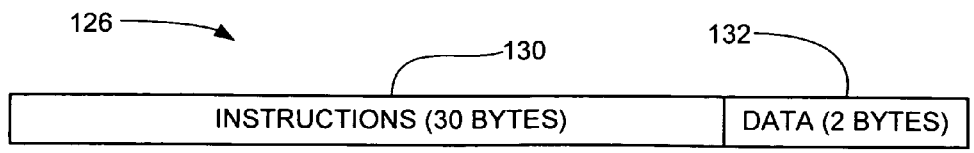
FIG. 3 depicts a generalized format for an operational request packet encoded by the main processor of FIG. 2.

The requests from the main processor 106 are preferably provided in the form of an operational request packet, such as generally represented at 126 in FIG. 3. The format for a given packet will depend upon the architecture of the array 100, but the illustrative packet 126 is shown to be 32 bytes in length (1 byte=8 bits), with 30 bytes of instructions and other related information (field 130) and 2 bytes of data (field 132). The packet 126 is preferably forwarded directly to the controller 122 via bus 112, or stored by the main processor 106 in a suitable register in memory (e.g., a portion of DRAM 110) which is subsequently polled by the controller 122.

A particular operational request by the main processor 106 may involve an operation by the path controller 122 that is not part of the native functionality of the controller; that is, the controller is not capable of directly arriving at the result for the operation. Alternatively, the path controller 122 may be able to carry out the operation, but in an unacceptably inefficient manner in view of the then-existing circumstances. The operation may also be such that the main processor 106, upon obtaining a result for the operation, cannot efficiently communicate the result to the path controller 122 for further processing. For convenience, these types of operations will be referred to herein as "complex" operations.

Accordingly, the main processor 106 operates to modify the complex operation to provide a corresponding simplex operation and remainder. For purposes herein, a "simplex" operation will be understood as describing an operation that can be readily received or carried out by the path controller (secondary processor). The main processor 106 then encodes an operational request packet to forward the simplex operation and the remainder to the path controller 122. In turn, the controller 122 performs the simplex operation and combines this with the remainder to complete the complex operation.

The following illustration may be helpful in understanding the foregoing sequence. It is contemplated that at some point during the operation of the array 100 the main processor 106 desires to divide a selected multi-bit value "X" by a second multi-bit value "Y". As those skilled in the art will recognize, if Y is a power of 2, the division X/Y can be readily carried out by shifting the bits of X to the right by a number of bits associated with the value Y (multiplication by a power of 2 is similarly carried out by shifting the bits to the left).

When Y is not a power of 2, however, such as if Y=30 (decimal), more complex processing will be required. The main processor 106 is contemplated as having the capability of dividing X by 30, but at this point in the current example it is contemplated that the path controller 122 does not have this capability. The controller 122 can perform a simplex bit shift division operation, however.

As will be recognized, the value X/30 can be rewritten as:

$$X/30 = X/32 + (X/30 - X/32) \tag{1}$$

Accordingly, the main processor 106 preferably identifies the closest power of two value to the Y operand (in this case, 32 or $2^5$), and then operates to separate the complex operation X/30 into the simplex operation X/32 and the remainder (X/30−X/32). It will be noted that this will preferably require the main processor 106 to calculate or otherwise determine the value X/30, the value X/32, and the remainder (X/30−X/32).

The main processor 106 next encodes an operational request (126, FIG. 3) for the path controller 122 to instruct the controller to divide X by 32 and then add the remainder. The operand X can be included in the packet, or can be stored in a memory location accessible by the controller 122, in which case the main processor 106 indicates the address of such location so that the controller 122 can retrieve the value therefrom. Additional instructions from the main processor 106 may be included in the packet as well, such an instruction to store the result of the initial complex operation in a selected memory location (e.g., a selected address in cache 124, etc.).

At this point it may not seem particularly clear why the main processor 106 involves the path controller 122 in the foregoing illustration, especially since the main processor 106 proceeds to calculate (or otherwise determine) the answer to the complex operation X/30 in the first place. However, there are situations where the foregoing packet encoding scheme represents a valuable approach from a resource management standpoint.

For example, consider a situation where there is insufficient space within the packet 126 to express the result of the complex operation X/30. In such a situation, a single packet generally cannot be used to convey both the result and the desired instructions to the path controller 122. However, since the remainder is a substantially smaller value, this can be readily accommodated in the 16-bit data field 132 of the packet, and the instruction field 130 can be used to communicate the necessary instructions, operands, identification of the desired mathematical operator(s), etc.

A related situation is where the main processor 106 needs the path controller 122 to store the result in a selected memory location inaccessible to the main processor 106, or otherwise take action that the main processor 106 cannot either physically or efficiently take. In such case, irrespective of whether the path controller 122 has the native functionality to carry out the initial complex operation, the foregoing packet encoding scheme allows the necessary information (instructions, operands, remainder, etc.) to be efficiently conveyed to the path controller 122 in a single packet exchange.

Another advantage to the use of the foregoing scheme is the ability to enhance the performance of the system in terms of the number of IOPS (Input/Output Operations per Second) that can be processed. Generally, the higher the IOPS, the sooner that user-initiated tasks can be completed. Since the structure of the path controller 122 allows certain memory locations to be accessed and certain types of tasks to be carried out faster than the main processor 106, the scheme allows tasks to be completed in a faster, more efficient manner from an IOPS standpoint.

While the foregoing illustrations have utilized mathematical operations (e.g., division), such is not limiting; rather, any number of different types of operations can be separated into constituent simplex and remainder elements and forwarded to the secondary processor. Similarly, while the foregoing architecture depicts a main and peripheral processor arrangement, other arrangements, including a greater number of processors or processors arranged in a peer-to-peer relationship, are readily envisioned as well.

Figure 4:
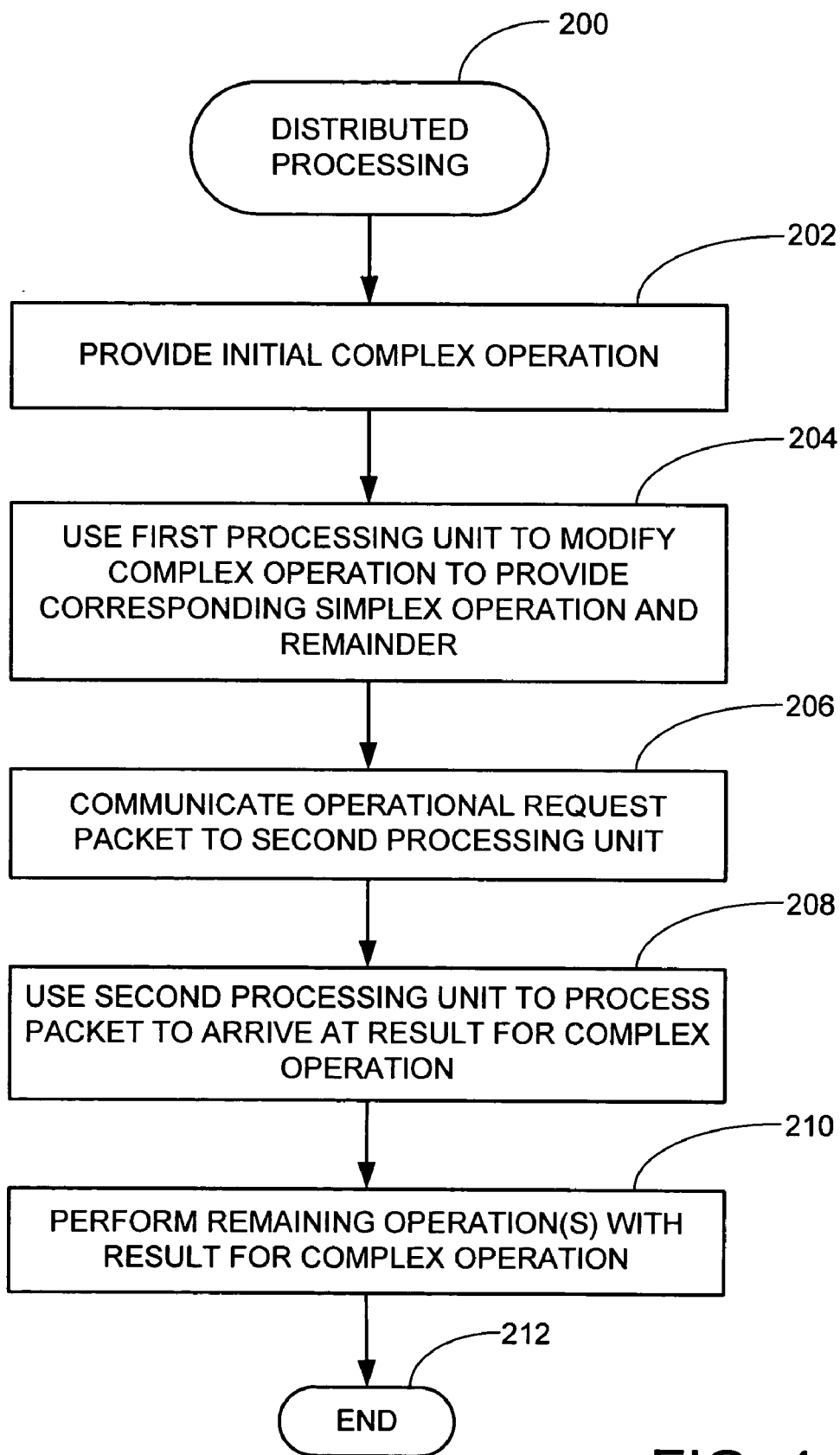
FIG. 4 is a flow chart for a DISTRIBUTED PROCESSING routine, illustrative of steps carried out in accordance with preferred embodiments of the present invention.

FIG. 4 provides a flow chart for a DISTRIBUTED PROCESSING routine 200, illustrative of steps carried out in accordance with preferred embodiments of the present invention. At step 202, an initial complex operation is first provided. At step 204, the first processor 106 modifies the initial complex operation to provide an operational request packet 126 comprising a corresponding simplex operation and a remainder. As explained above, this step can include the main processor 106 operating to initially solve or otherwise complete the initial complex operation.

At step 206, the operational request packet is transferred to the second processing unit 122. At step 208, the second processing unit 122 processes the packet to arrive at a result for the initial complex operation. This is preferably carried out by using the second processing unit 122 to obtain a result for the simplex operation and to combine such result with the remainder. Additional processing steps can be carried out as well during this step, such as storing or otherwise processing the result of the complex operation. The routine then ends at step 210.

It will be appreciated that the foregoing approach advantageously provides an efficient utilization of resources in that inter-processor operations can be efficiently encoded and distributed to meet the requirements of a given architecture. While various preferred embodiments discussed herein are particularly suitable for distributing complex mathematical operations (division, multiplication, addition, subtraction, etc.), such is not limiting.

In summary, preferred embodiments of the present invention are generally directed to a method and an apparatus for performing distributed processing in a multi-processing unit environment.

In accordance with some preferred embodiments, the method preferably comprises employing a first processing unit (such as 106) to modify a complex operation (such as equation (1)) to provide an operational request packet (such as 126) comprising a simplex operation and a remainder (such as by step 204).

The method further preferably comprises using a second processing unit (such as 122) to process said packet to arrive at a result for the complex operation (such as by step 208). Preferably, the processing by the second processing unit comprises obtaining a result for the simplex operation and then combining this result with the remainder to arrive at the result for the complex operation.

Preferably, the first processing unit determines the remainder during the employing step by separately arriving at said result for the complex operation. Moreover, the first processing unit further preferably determines the result for the simplex operation as well and determines the remainder in relation to the respective results for the simplex operation and the complex operation during the employing step.

Preferably, the complex operation is characterized as a mathematical operation on a first operand and the simplex operation is characterized as a mathematical operation on a second operand, wherein the first operand is not a power of two and the second operand is a power of two.

In accordance with further preferred embodiments, an apparatus (such as 100) comprises a first processing unit (such as 106) and a second processing unit (such as 122). The first processing unit is adapted to modify a complex operation to provide an operational request packet comprising a simplex operation and a remainder (such as by step 204), and the second processing unit is adapted to process said packet to arrive at a result for the initial complex operation (such as by step 208). At least a selected one of the first and second processing units is preferably characterized as a general purpose programmable computer.

As before, the first processing unit is preferably adapted to determine the remainder by separately arriving at said result for the complex operation, and to determine the remainder by arriving at a result for the simplex operation and combining such with the result for the complex operation.

Also, as before the complex operation is preferably characterized as a mathematical operation on a first operand and the simplex operation is preferably characterized as a mathematical operation on a second operand, wherein the first operand is not a power of two and the second operand is a power of two.

For purposes of the appended claims, the term "complex operation" will be defined consistent with the foregoing discussion to describe an operation that is not part of the native functionality of the second processing unit (e.g., non-bit-shift multiplication or division), an operation that is relatively difficult for the second processing unit to perform efficiently under the then-existing circumstances, or an operation the result of which cannot be efficiently communicated by the first processing unit to the second processing unit due to, for example, time or space constraints. The term "simplex operation" will be defined consistent with the foregoing discussion to describe an operation that can be readily communicated to or carried out by the second processing unit.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A method comprising steps of employing a first processing unit to arrive at a result of a complex operation and to provide a corresponding simplex operation and a remainder, and then using the simplex operation and remainder by a second processing unit to subsequently arrive at said result.

2. The method of claim 1, wherein the using step comprises employing the second processing unit to arrive at a result for the simplex operation and to combine the result for the simplex operation with the remainder to arrive at the result for the complex operation.

3. The method of claim 1, wherein the employing the first processing unit step further comprises using the first processing unit to determine the remainder in relation to said result.

4. The method of claim 1, wherein the first processing unit further stores the remainder in a memory location and identifies an address for said memory location to the second processing unit for retrieval of the remainder therefrom.

5. The method of claim 1, wherein the complex operation is characterized as a mathematical operation on a first operand and the simplex operation is characterized as a mathematical operation on a second operand different from the first operand, wherein the first operand is not a power of two, and wherein the second operand is a power of two.

6. The method of claim 5, wherein each of the respective mathematical operations comprises at least a selected one of an addition, a subtraction, a multiplication and a division operation.

7. The method of claim 1, wherein the first processing unit transmits the simplex operation and the remainder to the second processing unit in an operational request packet, and wherein the packet has a format size tat is sufficient to accommodate the remainder and the simplex operation but is insufficient to accommodate the result for the complex operation.

8. The method of claim 1, wherein at least a selected one of the first and second processing units comprises a programmable general purpose computer.

9. The method of claim 1, wherein the complex operation is not within a native functionality of the second processing unit so that the second processing unit is not capable of directly arriving at the result for the complex operation.

10. The method of claim 1, wherein the first processing unit further instructs the second processing unit to store the result for the complex operation in a selected memory location.

11. The method of claim 1, wherein the first and second processing units form a portion of a multi-device data storage array.

12. An apparatus comprising a first processing unit and a second processing unit, wherein the first processing unit is configured to arrive at a result of a complex operation and to provide a corresponding simplex operation and a remainder, and the second processing unit is configured to use the simplex operation and remainder to arrive at said result.

13. The apparatus of claim 12, wherein the first processing unit is further configured to determine the remainder in relation to the result of the complex operation.

14. The apparatus of claim 12, wherein the first processing unit is further adapted to arrive at a result for the simplex operation and to determine the remainder in relation to the respective results for the simplex operation and the complex operation.

15. The apparatus of claim 12, wherein the first processing unit is further adapted to transmit the simplex operation and the remainder to the second processing unit in an operational request packet.

16. The apparatus of claim 12, wherein the simplex operation comprises a mathematical operation performed on an operand.

17. The apparatus of claim 15, wherein the packet includes a data field that is sufficiently sized to accommodate the remainder but is insufficiently sized to accommodate the result for the complex operation.

18. The apparatus of claim 12, wherein the first processing unit comprises a main processing unit and wherein the second processing unit receives control inputs from the main processing unit.

19. The apparatus of claim 15, wherein the packet further comprises an instruction for the second processing unit to store the result for the complex operation in a selected memory location.

20. The apparatus of claim 12 characterized as a multi-device data storage array.

* * * * *